(12) United States Patent
Miller

(10) Patent No.: US 7,912,073 B2
(45) Date of Patent: Mar. 22, 2011

(54) SYNCHRONIZING MULTIPLE DATA CONVERTERS

(75) Inventor: Brian M. Miller, Liberty Lake, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 804 days.

(21) Appl. No.: 11/551,569

(22) Filed: Oct. 20, 2006

(65) Prior Publication Data

US 2008/0095285 A1      Apr. 24, 2008

(51) Int. Cl.
*H04L 12/28* (2006.01)
(52) U.S. Cl. .................. 370/395.62; 375/130
(58) Field of Classification Search .......... 370/389, 370/395.62; 375/130, 242; 329/304
See application file for complete search history.

(56) References Cited

U.S. PATENT DOCUMENTS

| | | | |
|---|---|---|---|
| 6,366,622 B1* | 4/2002 | Brown et al. | 375/322 |
| 6,836,851 B2 | 12/2004 | Dive | |
| 2004/0141526 A1 | 7/2004 | Balasubramanian et al. | |
| 2005/0100076 A1* | 5/2005 | Gazdzinski et al. | 375/130 |
| 2006/0034268 A1* | 2/2006 | Kim et al. | 370/389 |
| 2007/0195797 A1* | 8/2007 | Patel et al. | 370/400 |

FOREIGN PATENT DOCUMENTS

| | | |
|---|---|---|
| DE | 19858358 | 6/2000 |
| DE | 10013313 | 9/2001 |
| DE | 102004012307 | 10/2005 |

* cited by examiner

*Primary Examiner* — Dang T Ton
*Assistant Examiner* — Wei Zhao

(57) ABSTRACT

Synchronizing multiple-phase data converters by exchanging terminal count pulses via a bidirectional link. Multiple-phase data converters such as analog to digital converters (ADCs) or digital to analog converters (DACs) are synchronized to operate at the same phase by exchanging terminal count (TC) pulses and capturing counter state, representing a time offset from TC. Time offset and the symmetrical delay introduced by the link are used to solve for the delay introduced by the link and the off-set between devices. The offset information is used to align the devices. The process may be repeated to correct for drift.

19 Claims, 3 Drawing Sheets

SYNCHRONIZING MULTIPLE DATA CONVERTERS

TECHNICAL FIELD

Embodiments in accordance with the present invention relate to data converters, and more specifically, to synchronizing multiple-phase data converters.

BACKGROUND

High-speed data converters such as analog to digital converters (ADCs) and digital to analog converters (DACs) are the building blocks bridging analog and digital domains.

High speed ADC and DAC system often employ an architecture which decomposes the desired signal into N phases. Such a decomposition allows a converter to run at an overall clock frequency $F_{clk}$ where each phase runs at a reduced frequency of $F_{clk}/N$. Each of the N phases are appropriately interleaved to construct the desired fall rate ($F_{clk}$ signal.

When multiple devices are used in a system, there is commonly a need to synchronize the multiple devices so that at any given time each device is operating at the same phase. Each of the devices may be separated by a significant distance, for example, 10 feet. Sending a synchronization signal to all devices is a possible solution, but suffers from transport delay effects.

What is needed is a way to synchronize multiple-phase data converters.

SUMMARY OF THE INVENTION

Synchronization of multiple-phase data converters is achieved by exchanging counter states between multiple devices across a bidirectional link. Terminal count conditions are signaled on the bidirectional link, and the other device captures its counter state, representing a time offset from the terminal count. Counter state information is exchanged and used to solve for the offset between devices and the delay introduced by the link. The offset information is used to align the clocks.

DETAILED DESCRIPTION OF THE EMBODIMENTS

Figure 1:
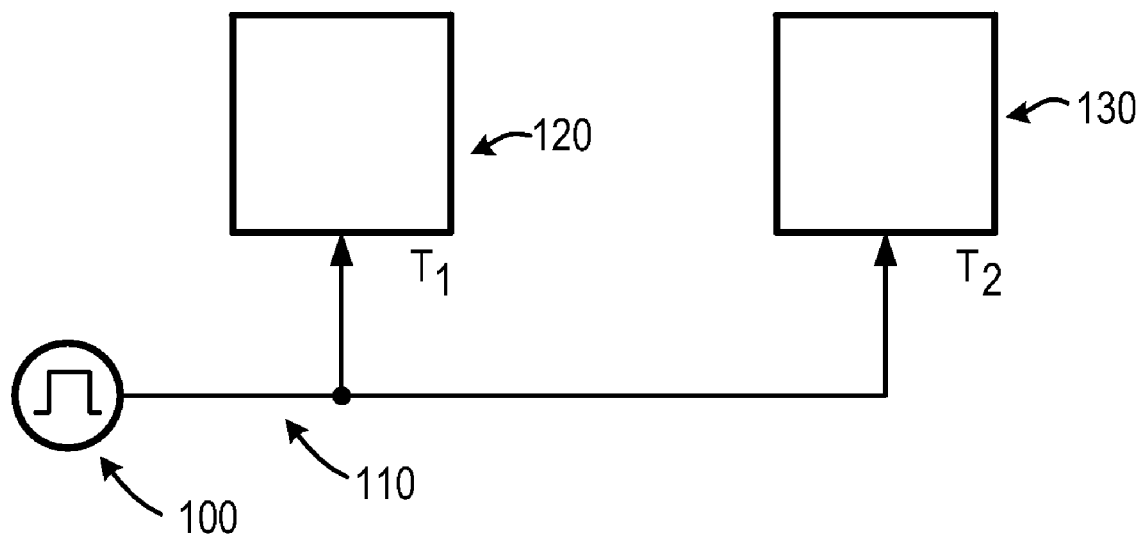
FIG. 1 shows a first system diagram as known to die art.

FIG. 1 is a system diagram showing multiple devices as known to the art. Synchronization source 100 sends a signal along cable 110 connecting devices 120 and 130. Due to the propagation delay along cable 110, the signal from source 100 arrives at device 120 at time T1, and arrives at device 130 at a later time T2. The difference between these times is attributable to signal propagation effects through cable 110, and thwarts precise synchronization.

Figure 2:
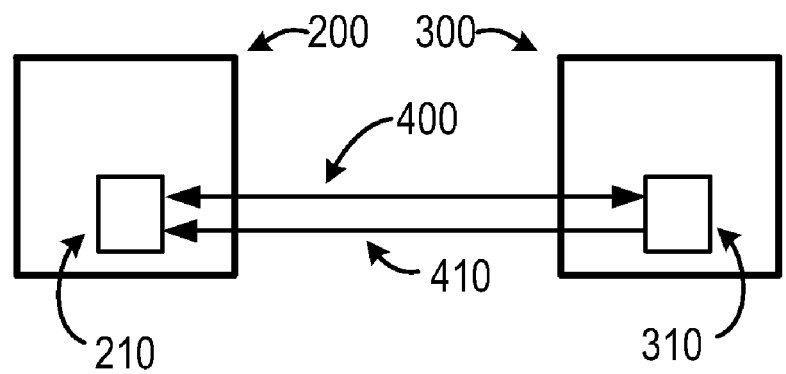
FIG. 2 shows a second system diagram.

In an embodiment of the present invention as shown in FIG. 2, data converter 200 in a first device and data converter 300 in a second device are interconnected by a symmetrical bidirectional link 400: symmetrical meaning that the delay between a signal transmitted by data converter 300 and reception of said signal by data converter 200 is identical to the delay between a signal transmitted by data converter 200 and reception of said signal by data converter 300. Data converters 200 and 300 are multi-phase. The number of phases used in data converters 200 and 300 are the same, represented as N. Converters 200 and 300 each contain a divide-by-N counter to support the decomposition into N phases, shown as counters 210 and 310.

According to an embodiment of the present invention, these counters are interconnected by a symmetrical bidirectional link 400. When counter 210 reaches its terminal count condition (TC1), it sends a pulse along link 400 to counter 310. When counter 310 receives this pulse, it captures the state of its counter (C2).

Similarly, when counter 310 reaches its terminal count (TC2), it sends a pulse along link 400 to counter 210. When counter 210 receives this pulse, it captures the state of its counter (C1).

Link 400 may be an electrical link such as a circuit board trace, a wire, or a coaxial cable. It may also be an electro-optical link. While link 400 introduces a delay due to the length of the interconnect and propagation through interface elements such as line drivers and receivers, or electro-optical converters, since link 400 is symmetric the delay from counter 210 to counter 310 is the same as the delay from counter 310 to counter 210, and is represented by TD.

When counter 310 captures the state of its counter, it transfers this data to counter 210 via link 410. This transfer is unidirectional, and is not time-critical. The data representing the captured state of counter 310 may be transferred bit-serial, bit-parallel, or other appropriate method. Link 410 may be a separate unidirectional link such as a wire or optical fiber, or it may be an existing link between devices used to transfer data, such as an Ethernet link between devices, IEEE-1394 link, IEEE-1488 link, USB, or other connection. While link 410 is shown as a separate path, this data could be signaled unidirectional along link 400.

The state of the each counter 210 and 310 can be considered an indication of time. If for example N=32, the divider states are 0, 1, 2, . . . , 31.

Define $T_{clk}=1/F_{clk}$. The counter states then represent times 0, $T_{clk}$, $2T_{clk}$ . . .

According to the present invention, by exchanging TC pulses between counters 210 and 310 and capturing the states of the counters at these times, and transferring one of these captured values to the other counter, we know:

(1) TD plus the time offset between TC1 and counter 310, and (2) TD minus the time offset between TC2 and counter 210.

While TD is not known, it introduces the same error into (1) and (2) above. We now have sufficient information to create two linear equations in two unknowns, TD the delay time introduced by link 400, and TOFF, the offset between counters 210 and 310.

This information is used to adjust the state of one of the two counters, for example, counter 210, so that counters 210 and 310 are in phase alignment This process may be performed once, such as upon system startup, as part of a self-test or self-calibration sequence initiated on device startup, or by a user command. This process may be performed periodically, such as once per second or once per minute to compensate for device drift, or aperiodically in response to internal or external events or conditions, such as a command in a test script.

Figure 3:
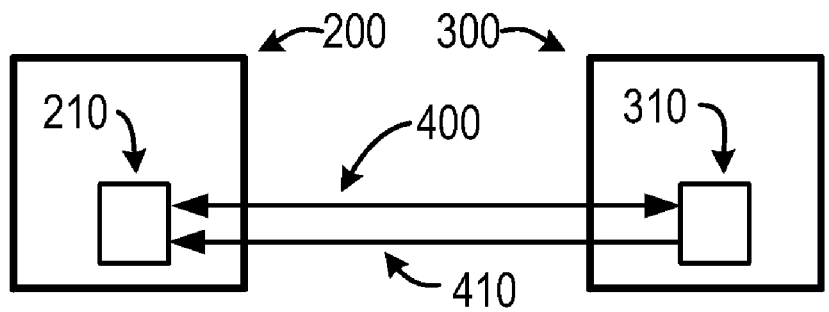
FIG. 3 shows a timing diagram.

An example is shown in FIG. 3. Assume for example N=8, TOFF=$2*T_{clk}$, and TD=$1*T_{clk}$. Assume TC pulses are sent out on link 400 when the counter=0. Counter 210 reaches TC; at that time counter 210 is 0 and counter 310 is 6. The TC pulse from counter 210 reaches counter 310 TD=1 tick later, and counter 310 records C2=7. This value is sent via link 410 to counter 210. When counter 310 reaches TC=0, counter 210 is 2. When the TC pulse from counter 310 reaches counter 210 TD=1 tick later, counter 210 records 3.

We now have the following two equations which may be solved at counter 210:

$$TD+TOFF=C2*T_c(=7T_c)$$

$$TD-TOFF=C1*T_c(=3T_c)$$

Subtracting the second equation from the first, TD cancels out, yielding:

$$2*TOFF=4*T_c \text{ or } TOFF=2*T_c$$

Counter 210 can now be adjusted by 2 clock periods to be in the same phase as clock 310. In an alternate embodiment, counter 210 can send a message via link 410 to counter 310 commanding it to adjust its counter by 2 clock periods.

While the illustrated embodiment has both counters sampling at the same specified terminal count (TC) value, this is not required. Each counter 210 and 310 may send pulses at any predetermined counter state. If those counter states are not the same between counters 210 and 310, then the clocks must record their own counter value when the pulse was sent as well as their counter value when the pulse is received. Following the example of FIG. 3, counter 310 sends not only its value when it received the pulse from counter 210, but also its counter value when it sent a pulse to counter 210.

While the present invention is shown operating between two converters, it may be extended to multiple converters by daisy-chaining data converters. Such daisy-chaining requires that each converter have two time-symmetric bidirectional ports. One such port represents a incoming link and the other an outgoing link. Inter-counter communication, link 410 of FIG. 3, could be a set of separate links, or a link interconnecting all counters, such as Ethernet, IEEE-1488, or similar data link.

Figure 4:
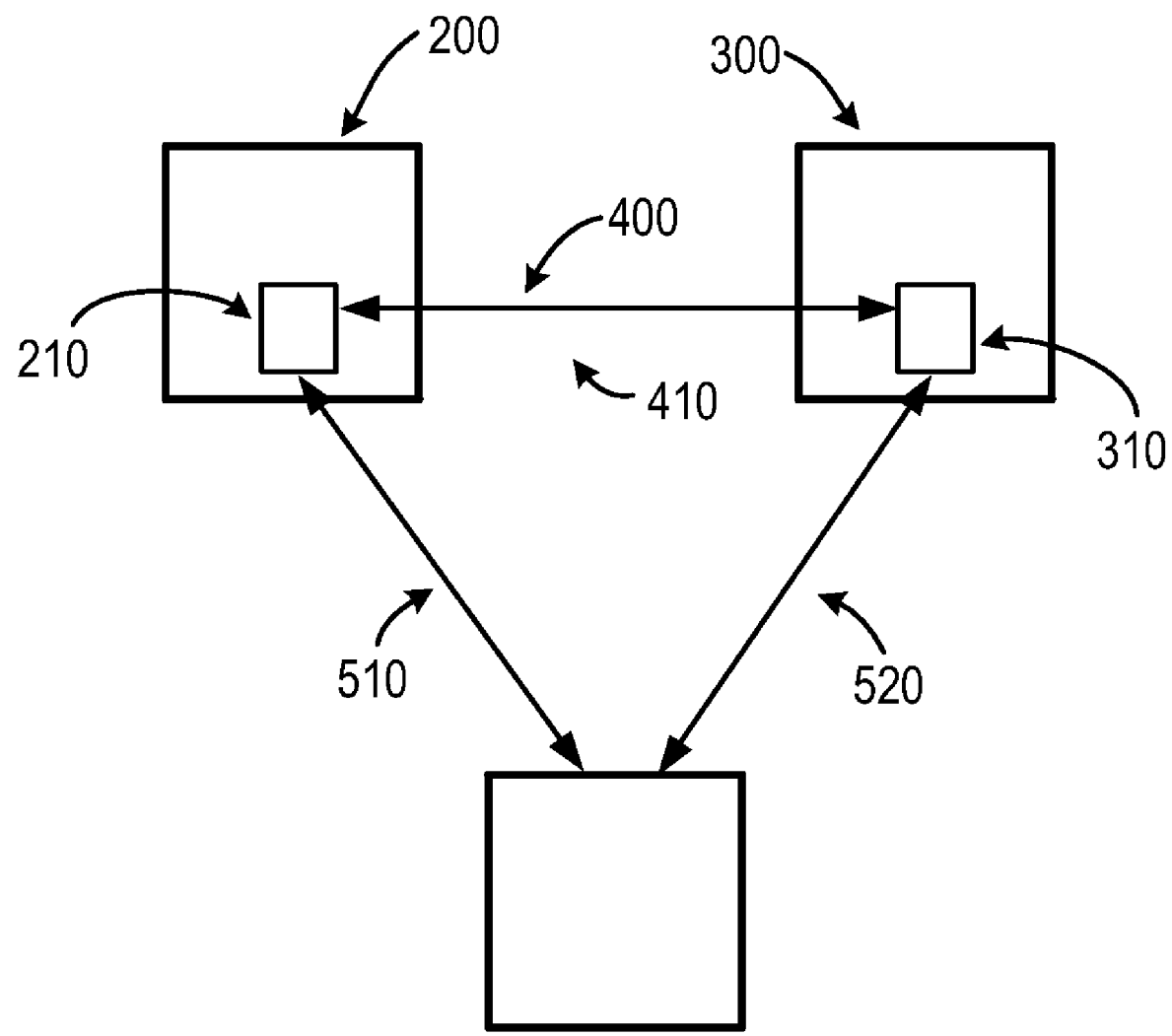
FIG. 4 shows a third system diagram.

An additional embodiment of the present invention is shown in FIG. 4. In this embodiment, counters 210 and 310 communicate via symmetric link 400. In this embodiment, however, both counters send information to correction processor 500 via links 510 and 520. Correction processor 500, typically a microprocessor or FPGA, performs the computations outlined above, and sends correction data along link 510 or 520 to counter 210 or 310 to perform clock adjustment. Correction processor 500 must know the number of states N in counter 210 and 310. This information may be preset in correction processor 500, or may be transmitted to it via links 510 and 520. Where both counters 210 and 310 use the same terminal count (TC) value for exchanging pulses, each counter 210 and 310 need only send along links 510 and 520 the value of its counter when the pulse arrived. If counters 210 and 310 do not use the same counter state to send pulses, then they must send this counter state information as well as counter values, as described previously, so that correction processor 500 has enough information to perform the offset calculation. While links 510 and 520 have been shown as separate paths, they may also be implemented as a common path, as an example, a shared Ethernet, IEEE-1488, or similar connection among clocks 210 and 310, and correction processor 500.

While the embodiments of the present invention have been illustrated in detail, it should be apparent that modifications and adaptations to these embodiments may occur to one skilled in the art without departing from the scope of the present invention as set forth in the following claims.

The invention claimed is:

1. A method of synchronizing a first clock in a first multiphase data converter with a second clock in a second multiphase data converter, the method comprising:
   connecting the first clock to the second clock using a first symmetric link,
   connecting the second clock to the first clock using a second link,
   sending a pulse along the symmetric link when the first clock reaches a predetermined condition,
   sending a pulse along the symmetric link when the second clock reaches a predetermined condition,
   capturing the state of the first clock as a first time offset when the pulse from the second clock arrives on the symmetric link,
   capturing the state of the second clock as a second time offset when the pulse from the first clock arrives on the symmetric link,
   transferring the second time offset from the second clock to the first clock via the second link, and
   computing an offset correction between the first clock and the second clock from the first time offset and the second time offset.

2. The method of claim 1 further comprising applying the offset correction to the first clock.

3. The method of claim 1 further comprising: transferring the offset correction to the second clock via the second link, and applying the offset correction to the second clock.

4. The method of claim 1 where the symmetric link is an electrical link.

5. The method of claim 1 where the symmetric link is an optical link.

6. The method of claim 1 where the symmetric link and the second link share the same electrical link.

7. The method of claim 1 where the symmetric link and the second link share the same optical link.

8. The method of claim 1 further comprising the step of calculating the time delay of the symmetric link.

9. The method of claim 1 where the steps are repeated on a periodic basis.

10. The method of claim 1 where the steps are repeated periodically on an as needed basis.

11. The method of claim 1 where the steps are performed in response to a user action.

12. A method of synchronizing a first clock in a first multiphase data converter with a second clock in a second multiphase data converter, the method comprising:
   connecting the first clock to the second clock using a first symmetric link,
   connecting the first clock and the second clock to a correction processor,
   sending a pulse along the symmetric link when the first clock reaches a predetermined condition,
   sending a pulse along the symmetric link when the second clock reaches a predetermined condition,
   capturing the state of the first clock as a first time offset when the pulse from the second clock arrives on the symmetric link,
   capturing the state of the second clock as a second time offset when the pulse from the first clock arrives on the symmetric link,
   transferring information captured at the first clock to the correction processor,
   transferring information captured at the second clock to the correction processor, computing in the correction processor an offset correction between the first clock and the second clock from the first time offset and the second time offset, and transferring the offset correction to either the first clock or the second clock.

13. The method of claim 12 where the information transferred from the first clock and the second clock to the correction processor includes time offsets.

14. The method of claim 12 where the information transferred from the first clock and the second clock to the correction processor includes clock states.

15. The method of claim 12 where the symmetric link is an electrical link.

16. The method of claim 12 where the symmetric link is an optical link.

17. The method of claim 12 further comprising calculating at the correction processor the time delay of the symmetric link.

18. The method of claim 12 wherein the method is repeated on a periodic basis.

19. The method of claim 12 wherein the method is performed in response to a user action.

* * * * *

UNITED STATES PATENT AND TRADEMARK OFFICE
CERTIFICATE OF CORRECTION

| | | |
|---|---|---|
| PATENT NO. | : 7,912,073 B2 | Page 1 of 1 |
| APPLICATION NO. | : 11/551569 | |
| DATED | : March 22, 2011 | |
| INVENTOR(S) | : Brian M. Miller | |

It is certified that error appears in the above-identified patent and that said Letters Patent is hereby corrected as shown below:

On the Title page, in field (57), under "Abstract", in column 2, line 9, delete "off-set" and insert -- offset --, therefor.

Signed and Sealed this
Tenth Day of May, 2011

David J. Kappos
*Director of the United States Patent and Trademark Office*